United States Patent
Gordon et al.

(10) Patent No.: US 9,773,419 B1
(45) Date of Patent: Sep. 26, 2017

(54) PRE-POSITIONING AERIAL DRONES

(71) Applicant: International Business Machines Corporation, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/079,127

(22) Filed: Mar. 24, 2016

(51) Int. Cl.
| | |
|---|---|
| *G05D 1/00* | (2006.01) |
| *B64C 19/00* | (2006.01) |
| *G08G 5/00* | (2006.01) |
| *G05D 1/02* | (2006.01) |
| *G05D 1/10* | (2006.01) |
| *G06Q 10/06* | (2012.01) |

(52) U.S. Cl.
CPC ......... *G08G 5/0069* (2013.01); *G05D 1/0011* (2013.01); *G05D 1/0202* (2013.01); *G05D 1/10* (2013.01); *G06Q 10/06314* (2013.01); *G06Q 10/06315* (2013.01); *B64C 2201/12* (2013.01)

(58) Field of Classification Search
CPC .. G08G 5/0069; G05D 1/0202; G05D 1/0011; G05D 1/10; G06Q 10/1093; G06Q 10/06314; G06Q 10/06315; H04L 67/325; B64C 2201/12
See application file for complete search history.

(56) References Cited

U.S. PATENT DOCUMENTS

| | | | | |
|---|---|---|---|---|
| 8,428,777 | B1 * | 4/2013 | Poursohi | G05B 19/41865 700/247 |
| 8,970,400 | B2 | 3/2015 | Verna et al. | |
| 9,014,848 | B2 | 4/2015 | Farlow | |
| 9,014,957 | B2 * | 4/2015 | Bonawitz | G08G 5/0034 701/120 |

(Continued)

FOREIGN PATENT DOCUMENTS

| | | |
|---|---|---|
| CN | 102436738 A | 9/2011 |
| CN | 204166693 U | 2/2015 |
| EP | 1840689 | 10/2007 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Michael J Zanelli
(74) *Attorney, Agent, or Firm* — Law Office of Jim Boice (57) ABSTRACT

A method, system, and/or computer program product pre-positions an aerial drone for a user. A model of a user is used as a basis for predicting a future task to be performed by the user at a future time and at a particular location. One or more processors identify sensor data that will be required by the user in order to perform the future task at the future time and at the particular location, where the sensor data is generated by one or more sensors on the aerial drone. A transmitter then transmits a signal to the aerial drone to pre-position the aerial drone at the particular location before the future time.

16 Claims, 7 Drawing Sheets

(56) References Cited

U.S. PATENT DOCUMENTS

| | | | |
|---|---|---|---|
| 9,056,676 B1 | 6/2015 | Wang | |
| 9,285,450 B2* | 3/2016 | DeVaul | G01S 1/042 |
| 9,412,278 B1* | 8/2016 | Gong | H04L 63/101 |
| 9,583,006 B2* | 2/2017 | Srivastava | G01C 21/20 |
| 2006/0114324 A1 | 6/2006 | Farmer | |
| 2012/0029964 A1 | 2/2012 | Tengler et al. | |
| 2014/0188541 A1 | 7/2014 | Goldsmith | |
| 2014/0195095 A1 | 7/2014 | Flohr | |
| 2015/0266577 A1 | 9/2015 | Jones | |
| 2015/0317582 A1 | 11/2015 | Nath | |
| 2015/0327136 A1 | 11/2015 | Kim | |
| 2016/0107749 A1* | 4/2016 | Mucci | B64C 39/024 701/3 |
| 2016/0357183 A1* | 12/2016 | Shaw | G05D 1/0027 |

OTHER PUBLICATIONS

Peters et al. "Unmanned Aircraft Systems for Logistics Applications". Arroyo Center, Rand Corporation, 2011.

* cited by examiner

PRE-POSITIONING AERIAL DRONES

BACKGROUND

The present disclosure relates to the field of aerial drones. More specifically, the present disclosure relates to pre-positioning aerial drones for future use by a user when performing a certain task.

An aerial drone is an unmanned aircraft, also known as an unmanned aerial vehicle (UAV). That is, an aerial drone is an airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

A method, system, and/or computer program product pre-position an aerial drone for a user. A model of a user is used as a basis for predicting a future task to be performed by the user at a future time and at a particular location. One or more processors identify sensor data that will be required by the user in order to perform the future task at the future time and at the particular location, where the sensor data is generated by one or more sensors on the aerial drone. A transmitter then transmits a signal to the aerial drone to pre-position the aerial drone at the particular location before the future time.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
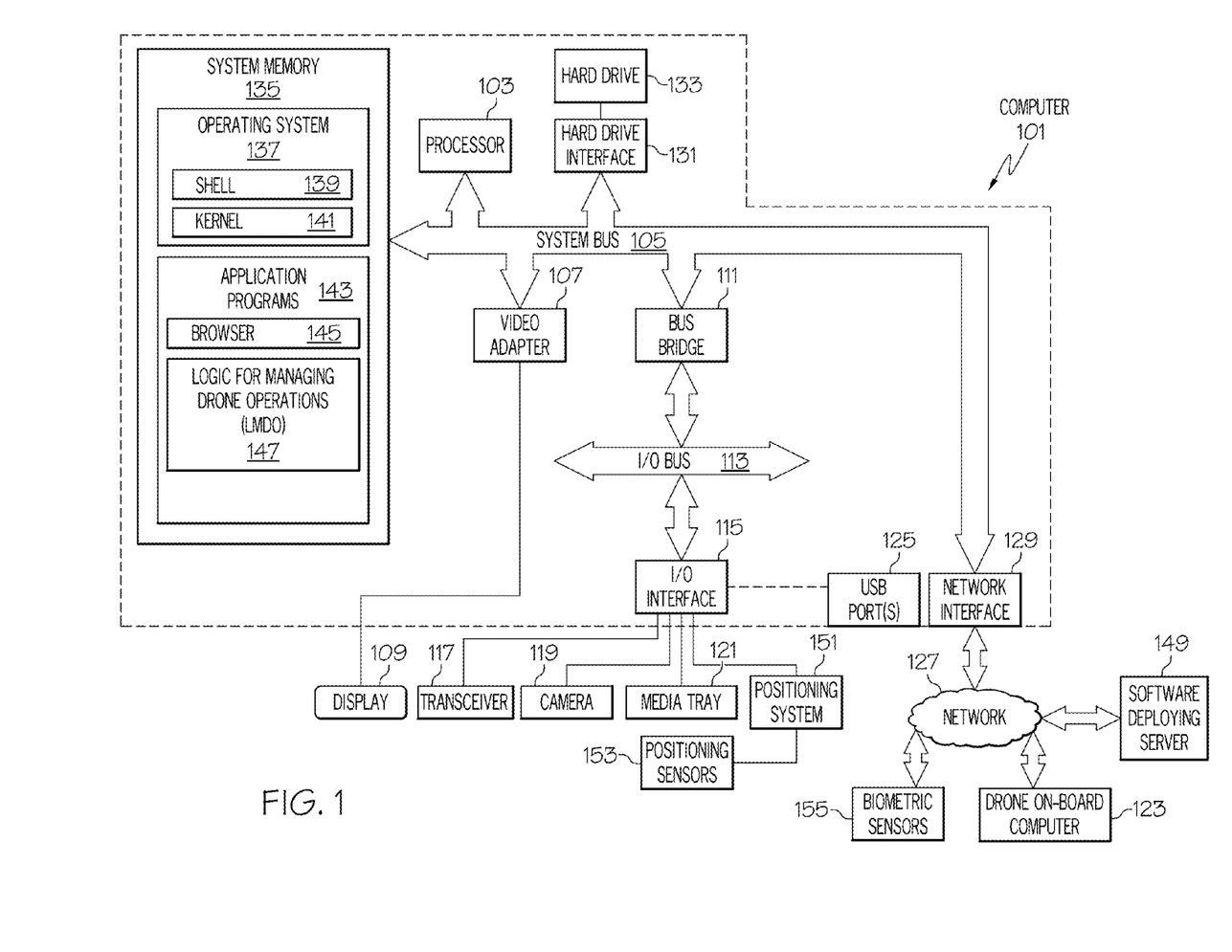
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or positioning system 151, and/or drone on-board computer 223 shown in FIG. 2, and/or drone on-board computer 323 shown in FIG. 3, and/or drone controller device 401 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a transceiver 117 (capable of transmitting and receiving electromagnetic transmissions), a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., drone on-board computer 123 and/or a software deploying server 149) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing Drone Operations (LMDO) 147. LMDO 147 includes code for implementing the processes described below, including those described in FIGS. 2-5. In one embodiment, computer 101 is able to download LMDO 147 from software deploying server 149, including in an on-demand basis. In one embodiment, software deploying server 149 is able to execute one or more instructions from LMDO 147 and provide the results to computer 101, thus relieving computer 101 from the need to utilize its internal processing power.

Also coupled to computer 101 is a set of one or more biometric sensors 153. Biometric sensors 153 are capable of detecting biometrics about a user, such as heart rate, respiratory rate, an electroencephalogram (EEG), an electrocardiogram (ECG/EKG), pupil movement, exhaled breath contents (e.g., carbon dioxide levels, medication levels, etc.), etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
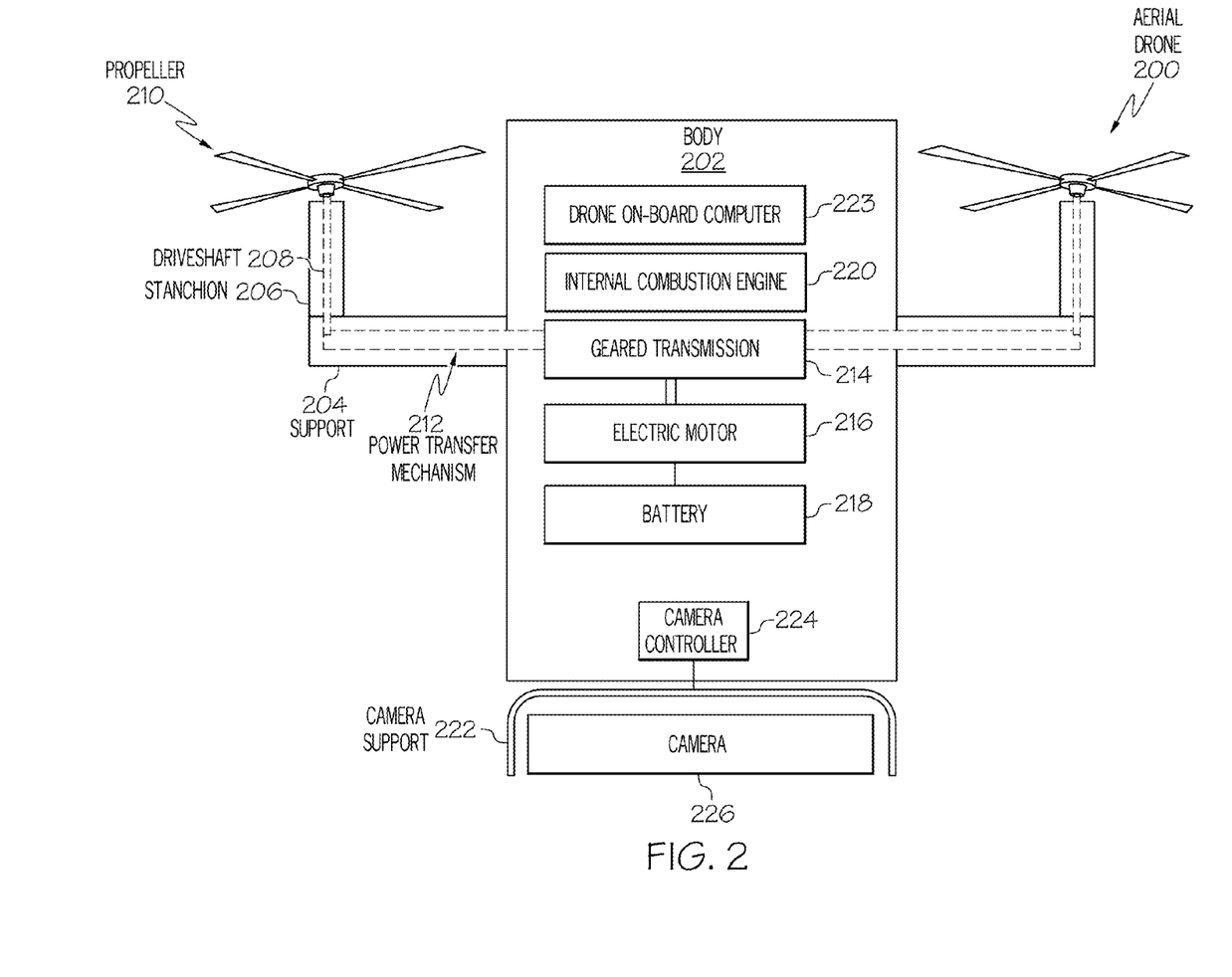
FIG. 2 depicts additional detail of an exemplary aerial drone in accordance with one or more embodiments of the present invention.

FIG. 2 illustrates an exemplary aerial drone 200 in accordance with one or more embodiments of the present invention. The terms "aerial drone", "drone", and "unmanned aerial vehicle" ("UAV") are used interchangeably herein to identify and describe an airborne vehicle that is capable of pilot-less flight.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the aerial drone 200. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power and have a greater range (can fly farther) than electric motors of the same size/weight.

Affixed to body 202 is a camera support 222 that holds a camera 226. A camera controller 224 is able to aim, focus, etc. camera 226 under the control of the drone on-board computer 223.

Figure 3:
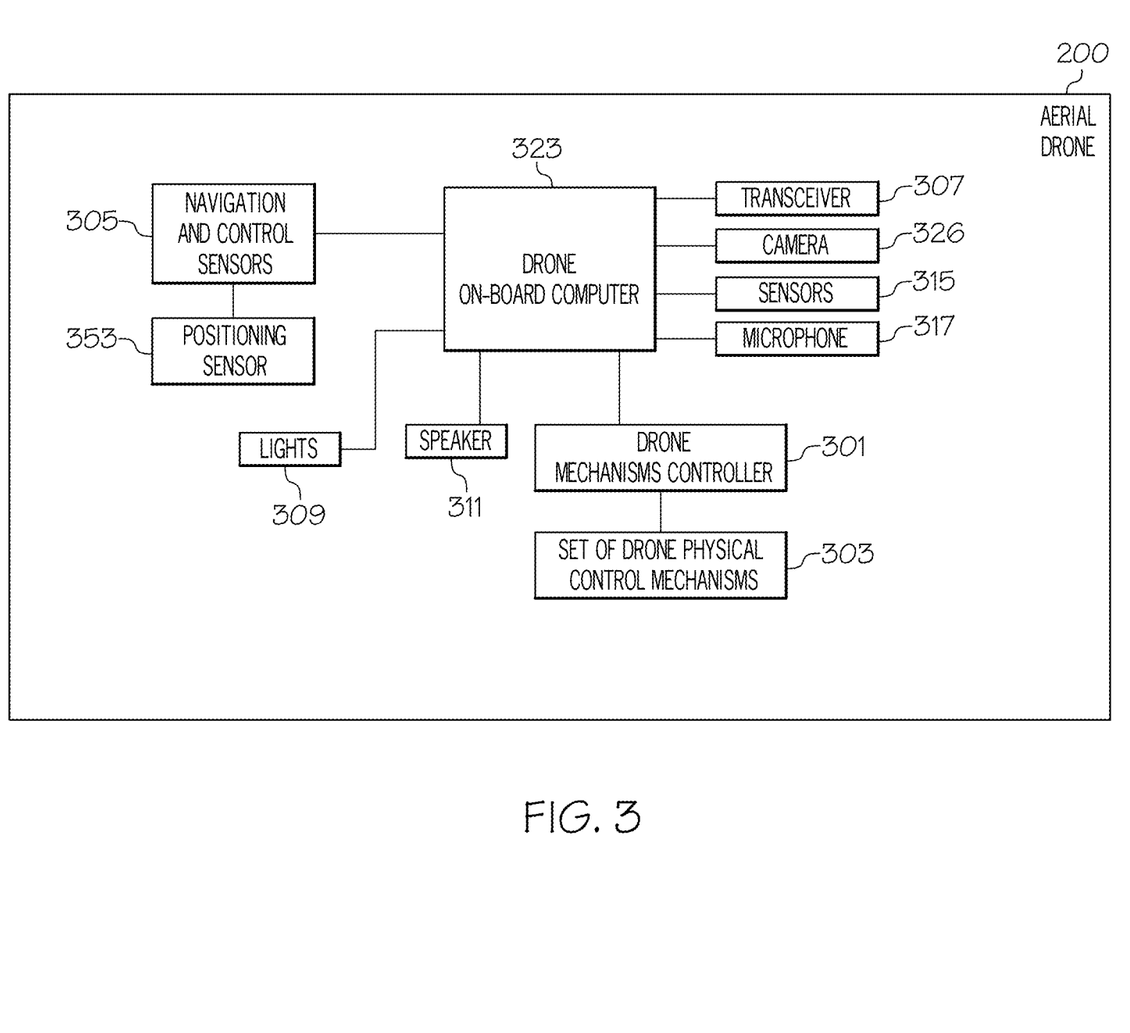
FIG. 3 illustrates control hardware and other hardware features of an exemplary aerial drone in accordance with one or more embodiments of the present invention.

With reference now to FIG. 3, exemplary control hardware within the aerial drone 200 presented in FIG. 2 is depicted.

A drone on-board computer 323 (analogous to drone on-board computer 223 shown in FIG. 2) controls a drone mechanisms controller 301, which is a computing device that controls a set of drone physical control mechanisms 303. The set of drone physical control mechanisms 303 includes, but is not limited to, throttles for internal combustion engine 220 and/or electric motor 216, selectors for selecting gear ratios within the geared transmission 214, controls for adjusting the pitch, roll, and angle of attack of propellers such as propeller 210 and other controls used to control the operation and movement of the aerial drone 200 depicted in FIG. 2.

Whether in autonomous mode or remotely-piloted mode, the drone on-board computer 323 controls the operation of aerial drone 200. This control includes the use of outputs from navigation and control sensors 305 to control the aerial drone 200. Navigation and control sensors 305 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 (shown in FIG. 1), which may be part of the drone on-board computer 323, combined with positioning sensor 353. Positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the drone on-board computer 323 may utilize radar or other electromagnetic energy that is emitted from an electromagnetic radiation transmitter (e.g., transceiver 307 shown in FIG. 3), bounced off a physical structure (e.g., a building, bridge, or another aerial drone), and then received by an electromagnetic radiation receiver (e.g., transceiver 307). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 2) on the aerial drone 200 and/or the positioning system 151 discussed above.

With respect to the feature of (4) providing any other inputs needed to safely control the movement of the aerial drone 200, such inputs include, but are not limited to, control signals to direct the aerial drone 200 to make an emergency landing, etc.

Also on aerial drone 200 in one or more embodiments of the present invention is a camera 326, which is capable of sending still or moving visible light digital photographic images (and/or infrared light digital photographic images) to the drone on-board computer 323. These images can be used to determine the location of the aerial drone 200 (e.g., by matching to known landmarks), to sense other drones/obstacles, and/or to determine speed (by tracking changes to images passing by) of the aerial drone.

Also on aerial drone 200 in one or more embodiments of the present invention are sensors 315. Examples of sensors 315 include, but are not limited to, air pressure gauges, microphones, barometers, chemical sensors, vibration sensors, etc., which detect a real-time operational condition of aerial drone 200 and/or an environment around aerial drone 200. Another example of a sensor from sensors 315 is a light sensor, which is able to detect light from other drones, street lights, home lights, etc., in order to ascertain the environment in which the aerial drone 200 is operating.

Also on aerial drone 200 in one or more embodiments of the present invention are lights 309. Lights 309 are activated by drone on-board computer 323 to provide visual warnings, alerts, etc. as described herein.

Also on aerial drone 200 in one or more embodiments of the present invention is a speaker 311. Speaker 311 is used by drone on-board computer 323 to provide aural warnings, alerts, etc.

Also on aerial drone 200 in one or more embodiments of the present invention is a microphone 317. In an embodiment, microphone 317 is an omnidirectional sensor that measures ambient noise (e.g., sound produced by the aerial drone 200). In the same or another embodiment, microphone 317 is a directional microphone (e.g., that captures sounds at some distance away from the aerial drone 200).

With further specificity now to the present invention, described herein in one or more embodiments is a system and method to couple an autonomous drone to a model of a user, such that the drone may be pre-positioned in the most likely location a user will want to receive and utilize the services (e.g., camera feed, audio feed, chemical monitoring, noise monitoring, etc.) offered by the drone. Such a model will allow multiple drones to provide precise needed information to users of the drones in real time, without a time lag between deployment and remote drone sensing.

In one or more embodiments of the present invention, a ranked list of likely next drone queries is presented to the user, and by selecting from this list, the user has access to remote drone sensing information. For example, a user may select from a list of pre-deployed drones that are monitoring conditions at the location of the drones such as air temperature, traffic conditions, the presence of certain chemicals, chemical spills, etc.

In one or more embodiments of the present invention, a drone accesses a user's electronic calendar on a user's computer, smart phone, or other intelligent electronic device that which is able to pre-deploy one or more drones at the appropriate time and place based on the calendar. That is, if the calendar shows that the user is planning on performing a certain job (e.g., open a valve on a pipeline) at a certain location (e.g., a remote valve location on the pipeline) at a certain time (e.g., the following day at 12:00 pm local time), then the present invention will pre-position a drone that is capable of detecting any gas leaks, photograph the area around the valve, monitor the weather around the valve, etc. based on sensor data generated by sensors on the drone, thus providing the user with sensor data needed to safely open the valve at that time. Note that the calendar that coordinates with the aerial drone may or may not be directly linked to an electronic calendar that is on the intelligent electronic device (phone, computer, etc.).

In one or more embodiments, a bidirectional feed is established between the drone and the user's electronic calendar such that sensor readings from the drone will cause the user's computer to adjust entries in the electronic calendar. For example, assume again that the user's electronic calendar shows that the user will be opening the pipeline valve at 12:00 pm on the following day. However, assume further that sensor readings from the drone at 11:30 pm on the following day detect very cold weather, which may cause damage to the pipeline if the valve were to be opened (e.g., due to high viscosity of liquids in the pipeline when the temperature is so low, thus straining/damaging the valve if it were opened). These sensor readings are sent to the user's computer, which has logic that interprets the sensor readings, and then cancels and/or reschedules the opening of the valve.

A user model ("model of the user") is a model of the user that is based on a profile of the user. This profile may include planned activities of the user (shown on the user's electronic calendar), the biometric states of the user (e.g., awake, asleep, sick, healthy, etc.), past activities (other than activating or otherwise using a drone) of the user, etc.

The drone may also check any of sunlight level (e.g. for people sensitive to exposure to UV radiation), pollution, pollen, the presence of annoying animals (e.g. barking dog), traffic levels, etc.

The drones discussed herein may be private, public, offered for rental, and combinations thereof. They may be perched in various docking stations in a town, country, home, telephone pole, etc., ready to be pre-deployed to specific locations from various staging areas.

In one or more embodiments, the system described herein includes devices to be used in a vehicle (e.g., a bike, car, etc.). Thus, the system may provide a means for updating an electronic calendar in a vehicle or on a bike (due to drone-acquired information). This may involve uploading an appointment to the electronic calendar, where the appointment includes a description of an event, a time block for the event, and a travel time preceding the time block. An alert is set in a telematics unit of the vehicle and/or the drone that communicates with one or more vehicles, where the alert notifies a vehicle occupant of the appointment. The alert is configured to be activated in response to a trigger (e.g., heavy traffic conditions).

The drone information described herein may be communicated to end users (or people listed on a calendar entry) via smartphones, tablet computers, laptops, and web-enabled devices, etc., in a manner comprised of separate technologies such as voice (voice to text, voice recognition), video stills (embedded with personalized iconographic identifiers), etc. This system may include a secondary purpose of allowing the notified recipients to engage others by allowing the retransmitting of received messages from a drone along with (or without) registered user annotations so as to create real-time dissemination of ongoing situational awareness data for users. This may be important for emergency management, such as evacuation of an area before or during a hurricane, where the information from the drone can be used to help the users schedule departure times to avoid massive traffic tie ups.

In order to facilitate this invention, the drone may optionally employ a traffic monitoring device, wherein the drone is equipped with imaging equipment, positioning equipment and transmission equipment, the imaging equipment is used for acquiring ground traffic videos, the positioning equipment is used for determining flight parameters and obtaining space-time information corresponding to the traffic videos, and the transmission equipment is used for transmitting the information acquired by the imaging equipment and the positioning equipment to the processing equipment, and the processing equipment is used for obtaining traffic information through calculation according to the traffic video.

If desired, the drone's road traffic patrol inspection system may be based on a mini-sized unmanned plane. The road traffic patrol inspection system comprises a flight control subsystem, a road monitoring detection subsystem and a road information issuing subsystem, wherein the flight control subsystem is used for filming traffic condition of road segments in a real-time manner. Filmed images are sent to the road monitoring detection subsystem, which is then used for processing the received images.

In one or more embodiments of the present invention, a drone is coupled to a wearable device and prediction software that allows a constant update of the expected next location of a user in space at intervals into the future. For example, a user may be monitored for position, heart rate, focus of attention, electronic calendar, etc., and the prediction software is able to estimate with a reasonable certainty where the user will be at 10, 20, and 30 minutes in the future (e.g., position 1, 2, and 3; P1, P2, P3). Based on these estimates, the system will deploy 3 drones (D1, D2, D3) at locations P1, P2, P3. A user interface on a user's hand-held device may then allow the user to scroll through future settings and collect information about those settings using the drones positioned at P1, P2, and P3. The user may configure these time intervals or the system may adapt to provide them in a way that is not redundant (e.g., by moving drones and time points as far into the future as needed to collect independent information; this avoids drones "clumping" when a user is expected to remain stationary for some time).

In one or more embodiments of the present invention, sensor readings from the one or more aerial drones are used not only to change settings in the user's electronic computer, but are also used to alert other meeting attendees. For example, if an aerial drone detects adverse weather conditions that will delay the user by 30 minutes when traveling to a scheduled meeting, then the system will 1) change the meeting time on the user's electronic calendar and 2) send an alert to other scheduled attendees that the user will be 30 minutes late. In one embodiment, this delay will be reflected as a change to the starting time of the meeting on 1) the user's electronic calendar and/or 2) the other attendees' electronic calendars.

In one or more embodiments of the present invention, readings from the one or more aerial drones are used to generate a recommendation for clothing, equipment, etc. to take to a meeting. For example, assume that an aerial drone detects snow at a meeting location shown on the electronic calendar(s) of a user of the aerial drone and/or other scheduled attendees for the meeting. Assume further that the meeting is to provide maintenance to a piece of outdoor equipment (e.g., a pumping system). As such, the system will send a message (text, e-mail, etc.) to the user and/or the other scheduled attendees to bring portable heaters to warm the pumping station equipment during the maintenance procedure, to wear warm weatherproof clothing, to bring personal protective equipment (e.g., a respirator) if snowy conditions are conducive to leaks of hazardous materials from the equipment, etc.

Figure 4:
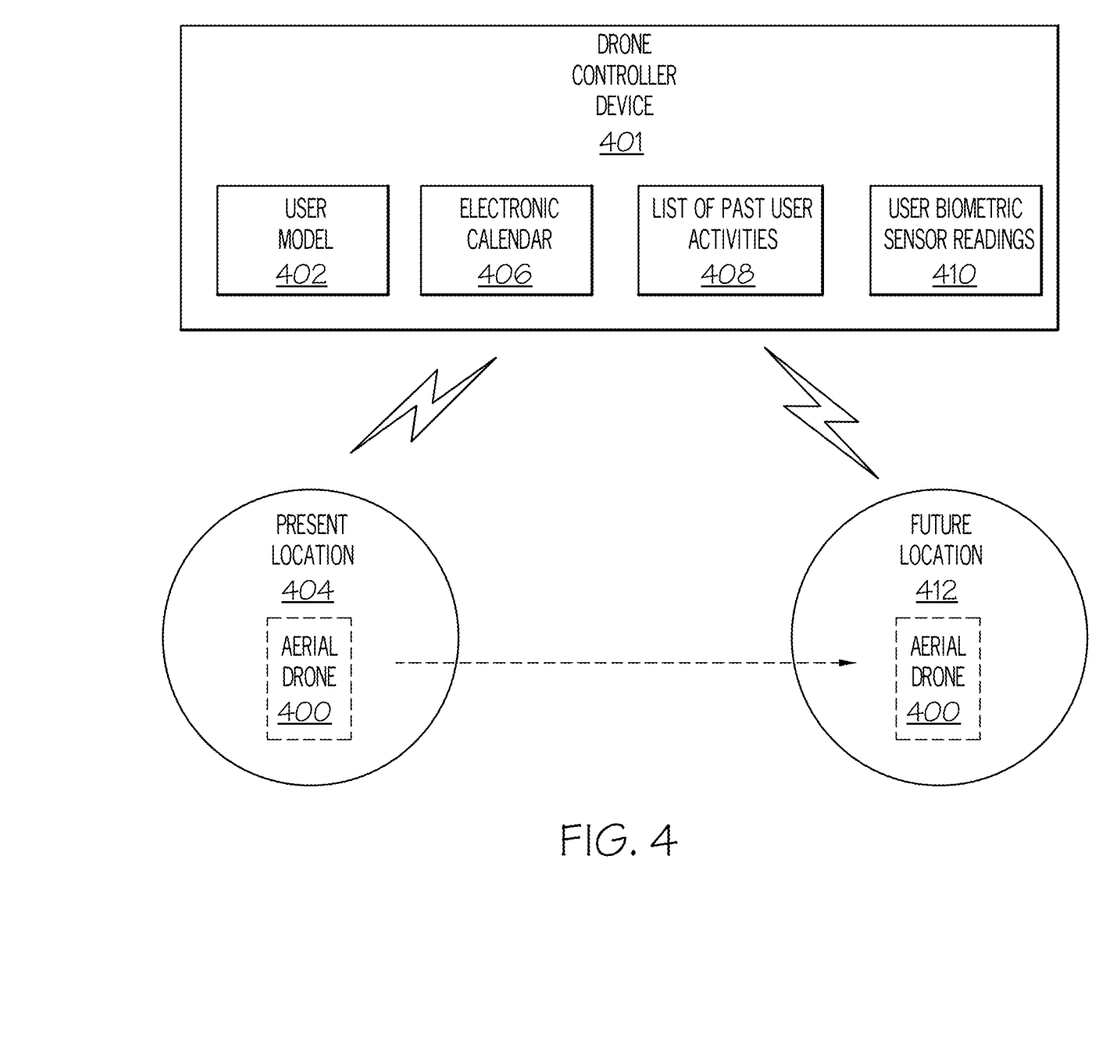
FIG. 4 depicts an aerial drone being utilized in accordance with one or more embodiments of the present invention.

Thus and with reference to FIG. 4, assume that a drone controller device 401 (analogous to computer 101 shown in FIG. 1) is controlling an aerial drone 400 (analogous to aerial drone 200 shown in FIG. 2) by sending control signals to the drone on-board computer 323 shown in FIG. 3).

Assume further that drone controller device 401 has access to a user model 402, which describes a profile of a particular user. This profile may include planned activities of the user (as shown on an electronic calendar 406, which may be within or external to the drone controller device 401), a list of past user activities 408, user biometric sensor readings 410 for the user, etc.

Based on the user model 402, the drone controller device 401 will pre-position the aerial drone 400 (e.g., by sending instructions to the drone on-board computer 323) directing the aerial drone 400 to move from a present location 404 (e.g., a staging area) to a future location 412 (e.g., a location that is remote from the present location 404). Preferably, this pre-positioning is timed such that the aerial drone 400 is at the future location 412 at a time that coincides with a particular task that the user will be performing (locally or remotely) at the future location.

Figure 5:
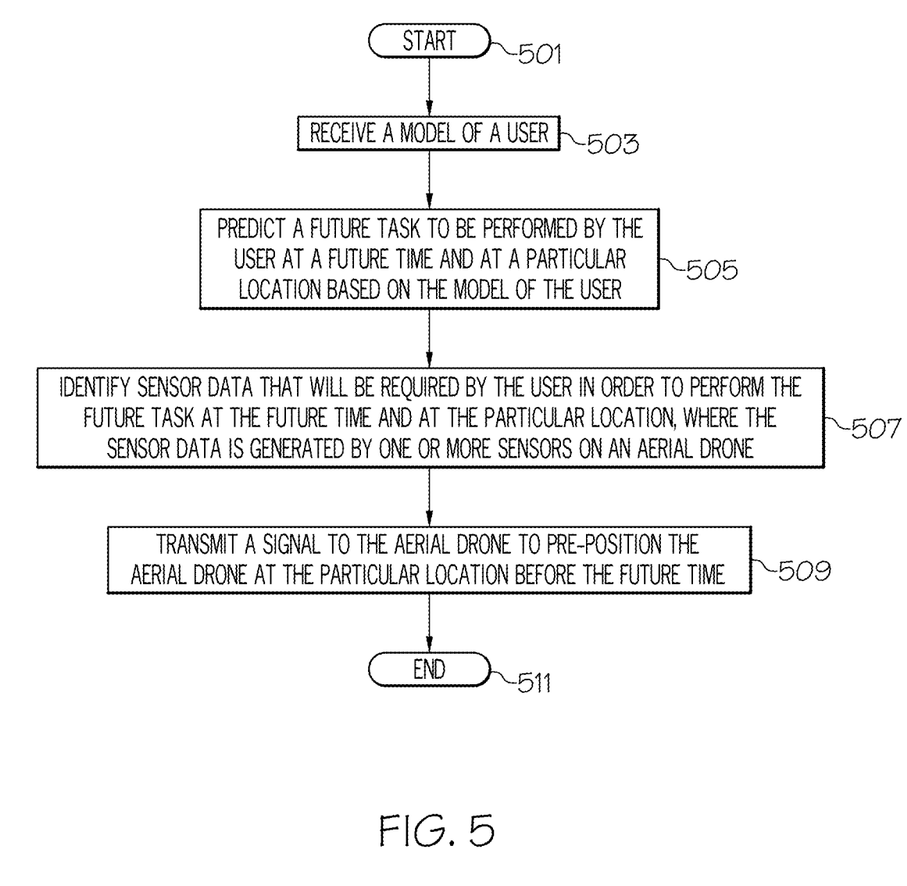
FIG. 5 is a high-level flow chart of one or more steps performed by one or more computing and/or other hardware devices to pre-position an aerial drone in accordance with one or more embodiments of the present invention.

With reference now to FIG. 5, a high-level flow chart of one or more steps performed by one or more computing and/or other hardware devices to pre-position an aerial drone in accordance with one or more embodiments of the present invention is presented.

After initiator block 501, one or more processors receive a model of a user, as described in block 503.

In an embodiment of the present invention, the model of the user is based on an entry in an electronic calendar. For example, assume that electronic calendar 406 shown in FIG. 4 contains an entry of a planned job/activity/event that the user will be performing at a particular future time and place. Thus, planned job/activity/event is used to create the model of the user, such that the model of the user is that of a person who is planning to perform the job/activity/event at a particular time and place in the future.

In an embodiment of the present invention, the model of the user is based on biometric sensor readings from biometric sensors (e.g., biometric sensors 155 shown in FIG. 1) that identify biological, emotional, and other human states of the user. Thus, one or more processors (e.g., within computer 101 in FIG. 1) receive biometric data from a biometric sensor that is monitoring the user, and then generate the model of the user based on the biometric data.

In an embodiment of the present invention, the model of the user is based on past activities of the user, exclusive of using an aerial drone. That is, the model of the user is not a model that is based on a history of the user deploying and using the aerial drone, but rather is a history of the user performing other activities. For example, the history may be the user driving a certain route on certain days, playing a certain game, operating a specific piece of equipment (other than an aerial drone), etc. Thus, the model of the user will describe a user who performs certain activities. Based on these past activities (other than deploying/using a drone), the system can determine that the user will require the use of a drone in the future. Thus, if the user model shows that the user is a cattle rancher, then the system will determine that the user will need a drone to monitor the location of cattle on his/her ranch. Therefore in this embodiment, one or more processors receive a record of past activities of the user (that exclude use of any aerial drone), and generate the model of the user based on the record of past activities of the user.

Returning to FIG. 5 and as described in block 505, the processor(s) then predict a future task to be performed by the user at a future time and at a particular location based on the model of the user. For example, the processor(s) may predict that this user will be surveying his/her cattle herd at future location 412 (see FIG. 4) on the next day at 12:00 pm.

As described in block 507, the processor(s) identify sensor data that will be required by the user in order to perform the future task at the future time and at the particular location, where the sensor data is generated by one or more sensors on an aerial drone. In the example of the cattle rancher, the processor(s) will determine that the rancher will need 1) a visual feed (from camera 326 shown in FIG. 3) and 2) a sound feed (from microphone 317 in FIG. 3) and 3) a chemical detection (e.g., from chemical sensors 315 in FIG. 3) that detects the presence of any toxins, all in the area of the cattle herd, in order to properly determine the condition of the cattle herd.

As described in block 509 in FIG. 5, a transmitter (e.g., transceiver 117 shown in FIG. 1) transmits a signal to the aerial drone (e.g., to the drone on-board computer 323 shown in FIG. 3 as part of aerial drone 200) to pre-position the aerial drone at the particular location before the future time.

The flow-chart ends at terminator block 511.

In an embodiment of the present invention, a bi-directional feed of information is established between the aerial drone (e.g., sensors 315 in the aerial drone 200 in FIG. 2) and the electronic calendar (e.g., the electronic calendar 406 in FIG. 4) using transceivers in the drone controller device 401 (e.g., transceiver 117 in FIG. 1) and the aerial drone (e.g., transceiver 307 in aerial drone 200 shown in FIG. 3). This allows the aerial drone to modify the electronic calendar and the aerial drone controller to modify operations of the drone.

Thus, one or more processors establish a bi-directional feed of information between the aerial drone and the electronic calendar, and then modify the entry in the electronic calendar based on the sensor data received from the one or more sensors in the aerial drone, as described herein.

In an embodiment, after establishing the bi-directional feed of information between the aerial drone and the electronic calendar, the processor(s) modify operations of the aerial drone based on the entry in the electronic calendar. That is, if the electronic calendar shows an original or new or changed entry in the electronic calendar, the system will adjust the operations of the aerial drone by 1) pre-positioning the aerial drone to the location where it will be needed, as well as 2) modifying the operation of the aerial drone. For example, if the aerial drone is equipped with both video and audio capturing capabilities, but the electronic calendar entry shows that the user will be only looking at the appearance of a cattle herd, then the camera 326 in FIG. 3 will be activated and the microphone 317 in FIG. 3 will be turned off (based on the entry in the electronic calendar). The location and time where and when the drone or multiple drones shall be needed by the user may change dynamically based on user inputs and/or changes in weather or other calendar activities and context information.

In an embodiment of the present invention, the aerial drone is a first aerial drone, and the method further comprises pre-positioning the first aerial drone at a first position at a first time, while pre-positioning a second aerial drone at a second position at a second time. Thus, the processors(s) determine a first position and a second position at which the user will perform a first future activity and a second future activity, where the second future activity is predicted to be performed by the user at a second time that is subsequent to a first time at which the first future activity is predicted to be performed by the user. The processor(s) then pre-position the first aerial drone at the first position at the first time and the second aerial drone at the second position at the second time.

In an embodiment of the present invention, the system is able to predict (e.g., based on the model of the user) what types of sensor data will be needed by the user. These predicted sensor data are then ranked based on their likelihood of being needed by the user. The user then selects one of the ranked (type of) sensor data that he/she will want in the future. Based on the user's selection, the appropriate aerial drone will be pre-positioned for future use. For example, assume that a user will be performing a task that may require the user of a video feed, an audio feed, or a chemical feed, with the likelihood in that order. This likelihood is based on the model of the user. For example, if the model of the user shows that the user has a history of visually watching cattle at certain time, then the system will determine that it is most likely that the user will want a video feed of the cattle for a future job. Assume further that these feeds are available from different video drones. The user will then choose (e.g., from a user interface on the drone controller device 401) a particular type of feed that he/she wants (e.g., the chemical feed, even though it is ranked below the video feed or audio feed). Based on this selection, the appropriate aerial drone will be pre-positioned for the user. Thus, one or more processors predict a set of sensor data that will be requested by the user based on the model of the user, and then rank each sensor data from the set of sensor data based on the model of the user. This ranked set of sensor data that is available to the user in real time from one or more aerial drones is presented on a user interface to the user. The processor(s) then receive a sensor data selection from a computer being used by the user, where the sensor data selection selects one or more of the ranked set of sensor data, and wherein a selected sensor data is generated by a particular aerial drone, and then direct the selected sensor data to be transmitted from a transmitter on the particular aerial drone to the computer being used by the user.

In an embodiment of the present invention, the user is enabled to choose which aerial drone from multiple aerial drones he/she wants to use, and can then reposition a selected aerial drone for his/her use. That is, there may be a set of publicly or privately available aerial drones for use/rent. As such, the user can select which aerial drone he/she wants to use and/or reserve for future use. Thus, assume that the aerial drone described herein is a first aerial drone from a set of multiple aerial drones. As such, one or more processors (e.g., from computer 101 shown in FIG. 1) present a list of the multiple aerial drones that are available to the user (e.g., on a user interface display). The processor (s) receive a selection from the list by the user, where the selection identifies a particular aerial drone from the multiple aerial drones on the list. In response to receiving the selection, the processor(s) establish a bidirectional communication session between the particular aerial drone and a user computer used by the user, where the bidirectional communication includes sensor data going from the particular aerial drone to the user computer, and where the bidirectional communication session further includes instructions going from the user computer to the aerial drone that will reposition the aerial drone based on the sensor data received from the aerial drone.

In an embodiment of the present invention, the user can select a particular aerial drone that has a certain ability (e.g., certain sensor(s)). That is, assume that there are multiple aerial drones that are available to the user, where each of the multiple aerial drones has a unique type of sensor that differs from other sensors on other aerial drones from the set of multiple aerial drones that are available to the user. Thus, one aerial drone may be able to stream video images, another may be able to stream audio, another may be able to detect chemicals, etc., but no single aerial drone can perform all of these tasks. As such, one or more processors (e.g., from computer 101 in FIG. 1) present a list (e.g., on a user interface) describing a sensor type of each unique sensor on the one or more of the multiple aerial drones that are available to the user. The user then selects the type of sensor that he/she wants the aerial drone to have. In response to receiving the selection of the particular sensor type from the user, processor(s) in the drone controller device 401 shown in FIG. 4 then reposition the particular aerial drone (having the sensor required by the user) to the particular location at which the future task is to be performed by the user.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
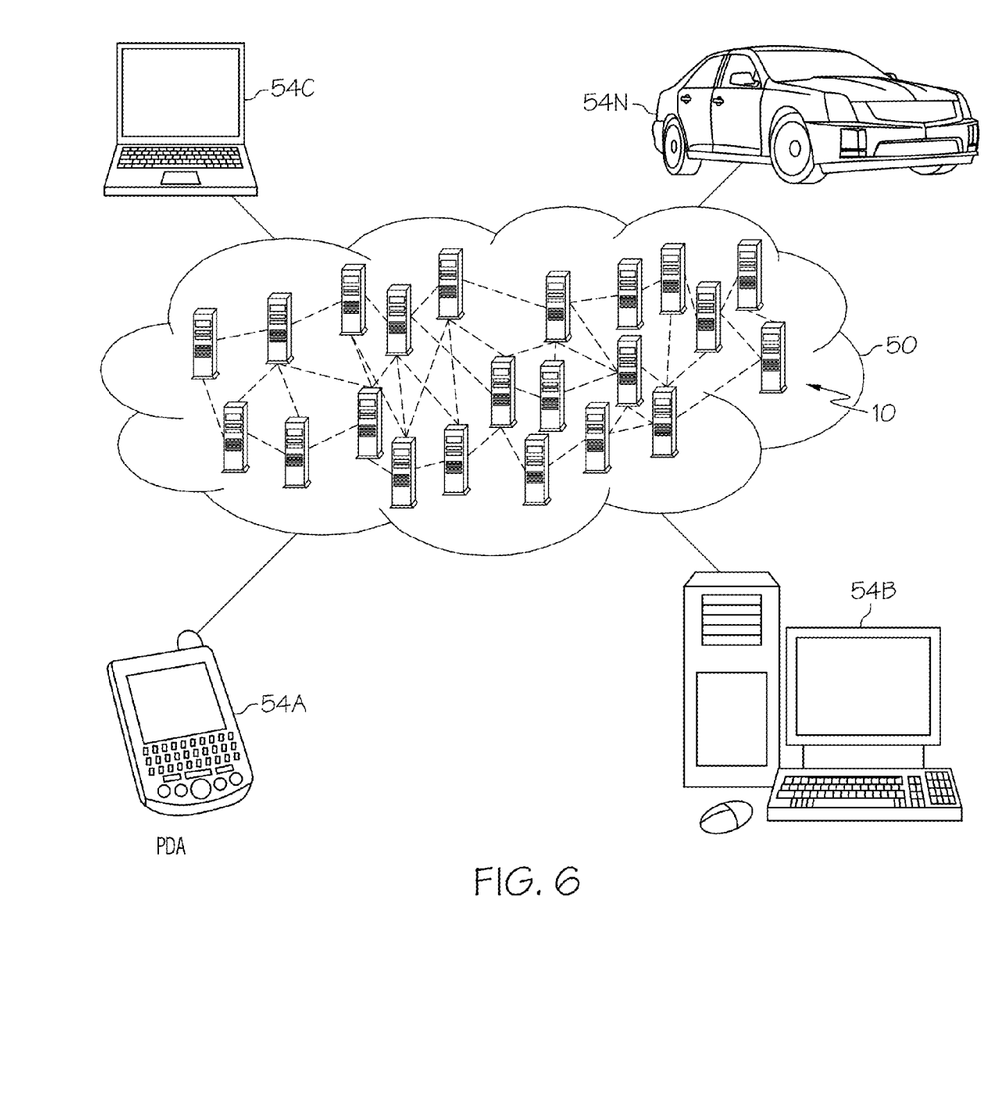
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
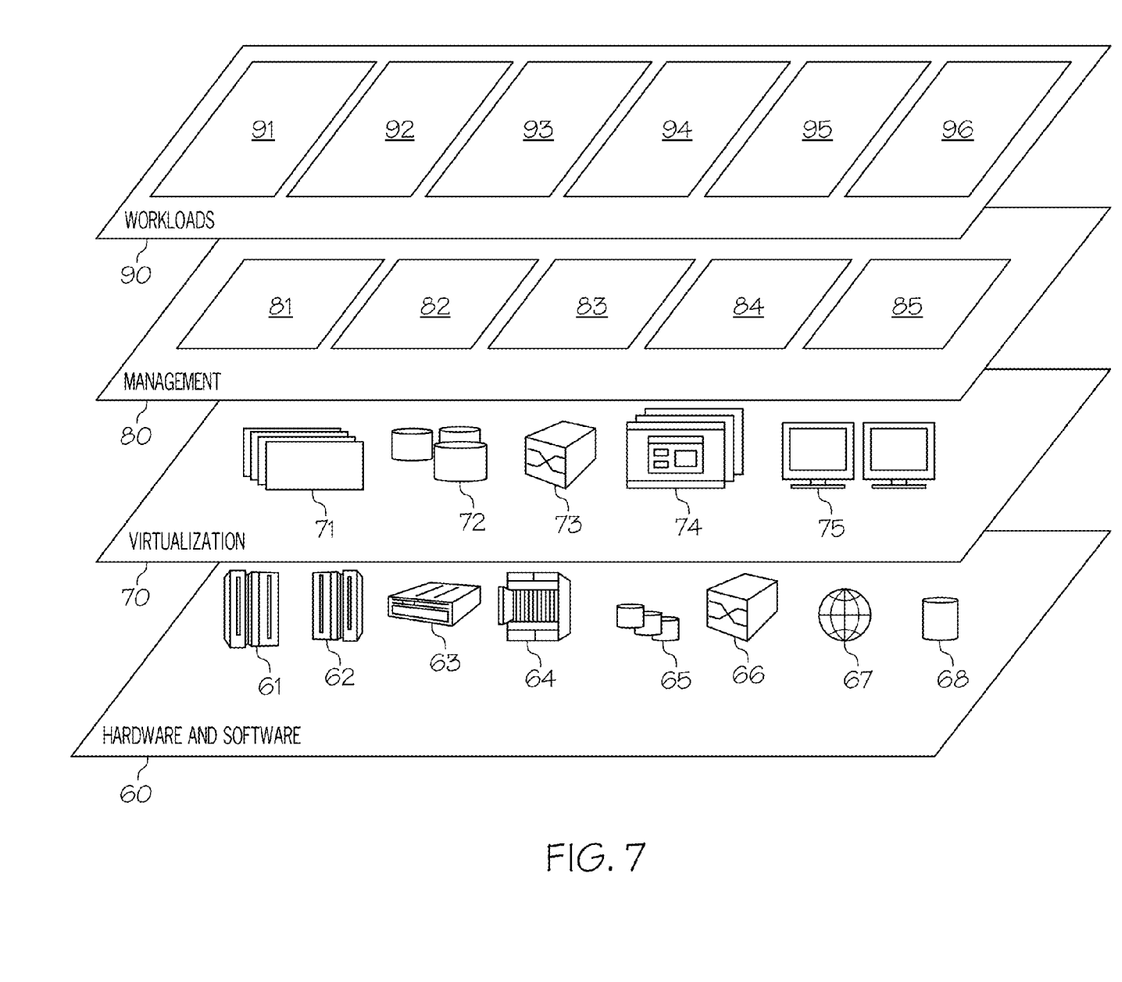
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by one or more processors, a model of a user;
    predicting, by one or more processors, a future task to be performed by the user at a future time and at a particular location based on the model of the user;
    identifying, by one or more processors, sensor data that will be required by the user in order to perform the future task at the future time and at the particular location, wherein the sensor data is generated by one or more sensors on an aerial drone;
    transmitting, by a transmitter, a signal to the aerial drone to pre-position the aerial drone at the particular location before the future time;
    retrieving, by one or more processors, a record of past activities of the user, wherein the past activities exclude use of any aerial drone; and
    generating, by one or more processors, the model of the user based on the record of past activities of the user.

2. The method of claim 1, further comprising:
    creating, by one or more processors, the model of the user based on an entry in an electronic calendar.

3. The method of claim 2, further comprising:
    establishing, by one or more processors, a bi-directional feed of information between the aerial drone and the electronic calendar; and modifying, by one or more processors, the entry in the electronic calendar based on the sensor data received from the one or more sensors in the aerial drone.

4. The method of claim 2, further comprising:
establishing, by one or more processors, a bi-directional feed of information between the aerial drone and the electronic calendar; and
modifying, by one or more processors, operations of the aerial drone based on the entry in the electronic calendar.

5. The method of claim 1, further comprising:
receiving, by one or more processors, biometric data from a biometric sensor that is monitoring the user; and
generating, by one or more processors, the model of the user based on the biometric data.

6. The method of claim 1, wherein the aerial drone is a first aerial drone, and wherein the method further comprises:
determining, by one or more processors, a first position and a second position at which the user will perform a first future activity and a second future activity, wherein the second future activity is predicted to be performed by the user at a second time that is subsequent to a first time at which the first future activity is predicted to be performed by the user;
pre-positioning, by one or more processors, the first aerial drone at the first position at the first time; and
pre-positioning, by one or more processors, a second aerial drone at the second position at the second time.

7. The method of claim 1, further comprising:
predicting, by one or more processors, a set of sensor data that will be requested by the user based on the model of the user;
ranking, by one or more processors, each sensor data from the set of sensor data based on the model of the user;
presenting, by one or more processors, a ranked set of sensor data that is available to the user in real time from one or more aerial drones;
receiving, by one or more processors, a sensor data selection from a computer being used by the user, wherein the sensor data selection selects one or more of the ranked set of sensor data, and wherein a selected sensor data is generated by a particular aerial drone; and
directing, by one or more processors, the selected sensor data to be transmitted from a transmitter on the particular aerial drone to the computer being used by the user.

8. The method of claim 1, wherein the aerial drone is a first aerial drone, wherein the first aerial drone is from a set of multiple aerial drones, and wherein the method further comprises:
presenting, by one or more processors, a list of the multiple aerial drones to the user;
receiving, by one or more processors, a selection from the list by the user, wherein the selection identifies a particular aerial drone from the multiple aerial drones on the list; and
in response to receiving the selection, establishing, by one or more processors, a bidirectional communication session between the particular aerial drone and a user computer used by the user, wherein the bidirectional communication comprises sensor data going from the particular aerial drone to the user computer, and wherein the bidirectional communication session further comprises instructions from the user computer to the aerial drone to reposition the aerial drone based on the sensor data received from the aerial drone.

9. The method of claim 1, wherein the aerial drone is a first aerial drone from a set of multiple aerial drones that are available to the user, wherein each of the multiple aerial drones has a unique type of sensor that differs from other sensors on other aerial drones from the set of multiple aerial drones that are available to the user, and wherein the method further comprises:
presenting, by one or more processors, a list describing a sensor type of each unique sensor on one or more of the multiple aerial drones that are available to the user;
receiving, by one or more processors, a selection of a particular sensor type by the user, wherein the particular sensor type describes a particular sensor on a particular aerial drone from the multiple aerial drones; and
in response to receiving the selection of the particular sensor type from the user, repositioning, by one or more processors, the particular aerial drone to the particular location at which the future task is to be performed by the user.

10. A computer program product comprising one or more computer readable storage mediums, and program instructions stored on at least one of the one or more storage mediums, the stored program instructions comprising:
program instructions to receive a model of a user;
program instructions to predict a future task to be performed by the user at a future time and at a particular location based on the model of the user;
program instructions to identify sensor data that will be required by the user in order to perform the future task at the future time and at the particular location, wherein the sensor data is generated by one or more sensors on an aerial drone;
program instructions to transmit, from a transmitter, a signal to the aerial drone to pre-position the aerial drone at the particular location before the future time;
program instructions to create the model of the user based on an entry in an electronic calendar;
program instructions to establish a bi-directional feed of information between the aerial drone and the electronic calendar; and
program instructions to modify the entry in the electronic calendar based on the sensor data received from the one or more sensors in the aerial drone.

11. The computer program product of claim 10, further comprising:
program instructions to modify operations of the aerial drone based on the entry in the electronic calendar.

12. The computer program product of claim 10, further comprising:
program instructions to receive biometric data from a biometric sensor that is monitoring the user; and
program instructions to generate the model of the user based on the biometric data.

13. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to receive a model of a user;
program instructions to predict a future task to be performed by the user at a future time and at a particular location based on the model of the user;
program instructions to identify sensor data that will be required by the user in order to perform the future task at the future time and at the particular location, wherein the sensor data is generated by one or more sensors on an aerial drone;

program instructions to transmit, via a transmitter, a signal to the aerial drone to pre-position the aerial drone at the particular location before the future time;

program instructions to retrieve a record of past activities of the user, wherein the past activities exclude use of any aerial drone; and program instructions to generate the model of the user based on the record of past activities of the user.

14. The computer system of claim 13, wherein the aerial drone is a first aerial drone, and wherein the computer system further comprises:

program instructions to determine a first position and a second position at which the user will perform a first future activity and a second future activity, wherein the second future activity is predicted to be performed by the user at a second time that is subsequent to a first time at which the first future activity is predicted to be performed by the user;

program instructions to pre-position the first aerial drone at the first position at the first time; and program instructions to pre-position a second aerial drone at the second position at the second time.

15. The computer system of claim 13, further comprising:

program instructions to predict a set of sensor data that will be requested by the user based on the model of the user;

program instructions to rank each sensor data from the set of sensor data based on the model of the user;

program instructions to present a ranked set of sensor data that is available to the user in real time from one or more aerial drones;

program instructions to receive a sensor data selection from a computer being used by the user, wherein the sensor data selection selects one or more of the ranked set of sensor data, and wherein a selected sensor data is generated by a particular aerial drone; and program instructions to direct the selected sensor data to be transmitted from a transmitter on the particular aerial drone to the computer being used by the user.

16. The computer system of claim 13, wherein the aerial drone is a first aerial drone from a set of multiple aerial drones that are available to the user, wherein each of the multiple aerial drones has a unique type of sensor that differs from other sensors on other aerial drones from the set of multiple aerial drones, and wherein the computer system further comprises:

program instructions to present a list describing a sensor type of each unique sensor from one or more of the multiple aerial drones that are available to the user;

program instructions to receive a selection of a particular sensor type by the user, wherein the particular sensor type describes a particular sensor on a particular aerial drone from the set of multiple aerial drones; and program instructions to, in response to receiving the selection of the particular sensor type, reposition the particular aerial drone to the particular location at which the future task is to be performed by the user.

* * * * *